CHARLES H. HUTCHINSON.
Improvement in Balanced Slide-Valves.
No. 126,459. Patented May 7, 1872.

Witnesses:
E. Wolff.
Geo. W. Mabee

Inventor:
C. H. Hutchinson
per ——— Attorneys.

126,459

UNITED STATES PATENT OFFICE.

CHARLES H. HUTCHINSON, OF CONCORD, NEW HAMPSHIRE.

IMPROVEMENT IN BALANCED SLIDE-VALVES.

Specification forming part of Letters Patent No. 126,459, dated May 7, 1872.

Specification describing a new and Improved Balanced Slide-Valve, invented by CHARLES H. HUTCHINSON, of Concord, in the county of Merrimack and State of New Hampshire.

My invention relates to that class of balanced valves which are made in two parts, one working on the valve-seat and the other on the under side of the top of the steam-chest, to prevent too much down pressure, and one of the parts working in and out of the other steam-tight. The first part of my invention consists in having the parts of the valves thus working together of rectangular form, corresponding to the flanges, so that the down pressure will be alike throughout the valve from end to end. The second part consists of a novel arrangement of the packing for said parts, whereby it is adapted to such forms, and may be accurately fitted in a simple and economical manner; and the third part consists of the application of an exhaust-valve, which opens to withdraw the steam from the interior space of said slide-valve in case the packing leaks, so that the said space fills to prevent down pressure on the lower part of the valve, but which exhaust-valve closes when steam is shut off and the engine continues to run.

Figure 1:
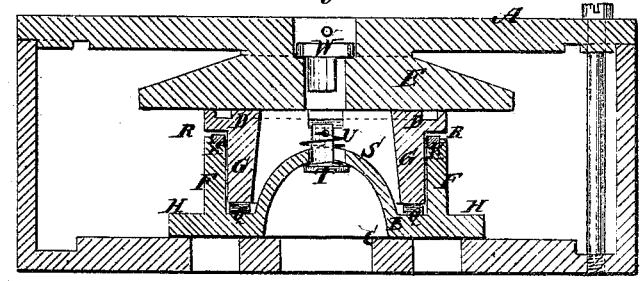
Figure 2:
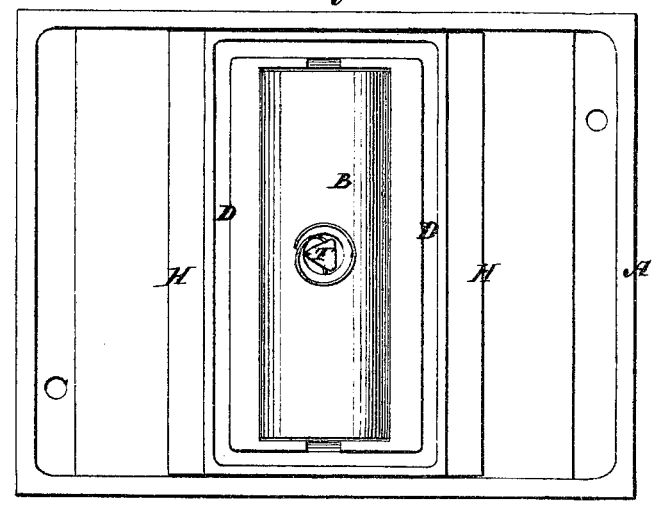
Figure 3:
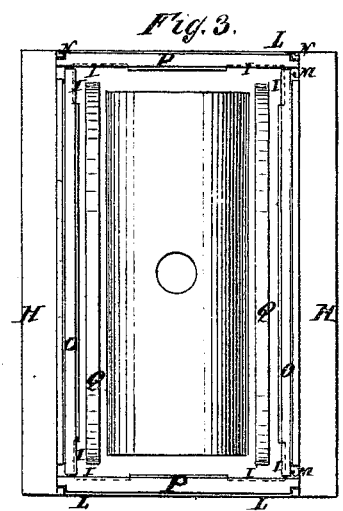

Figure 1 is a longitudinal sectional elevation of a valve-chest and a valve constructed according to my invention. Fig. 2 is a top view of the chest without its top, and of the lower part of the valve; and Fig. 3 is a top view of the lower part of the valve and the packing.

Similar letters of reference indicate corresponding parts.

A is the valve-chest. B is the lower part of the valve, working on the ordinary seat C. D is the upper part, working against the under side of the top of the steam-chest, or a secondary part, E, thereof. Now if, in valves of this kind for locomotive and other engines requiring great length in the direction perpendicular to the movement of the piston, but narrow in the other direction, the hollow part F of the lower part B, and the corresponding part G of part D, which are used together with steam-packing to exclude steam-pressure from the greater portion of part B, be made cylindrical, as heretofore, the flange H, whereon the same acts to keep the valve on its seat, will have to be made cylindrical also, and thus require far more space between the ends of the valve-chest than can be afforded; or they will be so covered by the said cylindrical parts, except at the corners, that there will be no down pressure except on said corners to counteract the upward pressure, which I have found practically to be so great in locomotive and other engines using high pressure that such valves are sprung upward to such extent that the steam blows through to the exhaust excessively. These parts of such valves have heretofore universally been made cylindrical, in consequence of the facility they afford in fitting in the packing, for which grooves which must be very accurate can easily be turned in the said cylindrical forms, while there has been no known method of applying the packing accurately and cheaply to other forms. Therefore I have adopted the rectangular form for such parts, as indicated at F and G, and, the one, G, being fitted on the outside to work accurately on the inside of F, by accurately planing off the sides, also by planing the inside of F between the cavities I, cored out at the corners to let the tool of the planing-machine shift, as indicated by the dotted lines in Fig. 3, I plane the grooves or rabbets K in the upper edges of the two long sides of F, and plane off the whole of the upper edges of the two short sides exactly to the same level, as shown in Fig. 3, at L; then I plane the notches M crosswise through the top of the long sides, near the ends to the same level, leaving the corner studs N, all of which can be done with the same accuracy that a groove can be turned in a cylindrical form. Then I fit the metal packing-strips O in the grooves of the long sides, and the pieces P upon the top of the short sides, said pieces being retained by the studs N, and the pieces O being held by the wall of the rabbet. These packing-strips have only to be accurately fitted as to width and length—being planed to width—all of which can be done in an inexpensive way. The upper part of the valve is held up against the plate E by the springs Q. I apply a small valve, T, to said part B, opening downward, with a spring, U, above, of just sufficient power to keep it closed, to allow of the escape of any steam that might leak into space S and create downward pressure when the engine is running with steam. But when the engine is running without steam said valve is to remain closed, so as to admit of forming a vacuum on the whole area of the valve, which will allow it to be raised by the least possible pressure under it to permit the air to pass from one end of the cylinder to the other, and thus prevent the forming of a vacuum behind the piston, which, when steam is shut off, greatly obstructs its movements.

Having thus described my invention, I claim as new and desire to secure by Letters Patent—

1. The combination, with the two parts B D with rectangular flanges H R, of the hollow rectangular parts F G, substantially as specified.

2. The combination, with the said hollow rectangular parts F G, of the metal packing O P fitted in the top of the said part F, substantially in the manner specified.

3. An exhaust-valve, combined with the within-described balanced valve in such manner as to relieve the part B of pressure in space S, substantially as specified.

CHARLES H. HUTCHINSON.

Witnesses:
D. L. JEWELL,
E. E. TRUESDELL.